US012734633B2

(12) United States Patent
Yasuda

(10) Patent No.: US 12,734,633 B2
(45) Date of Patent: Sep. 15, 2026

(54) CONTROL DEVICE FOR MACHINE TOOL

(71) Applicant: FANUC CORPORATION, Yamanashi (JP)

(72) Inventor: Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 367 days.

(21) Appl. No.: 18/573,493

(22) PCT Filed: Jul. 28, 2021

(86) PCT No.: PCT/JP2021/027845
§ 371 (c)(1),
(2) Date: Dec. 22, 2023

(87) PCT Pub. No.: WO2023/007602
PCT Pub. Date: Feb. 2, 2023

(65) Prior Publication Data
US 2024/0293906 A1 Sep. 5, 2024

(51) Int. Cl.
*G05D 19/02* (2006.01)
*B23Q 15/013* (2006.01)

(52) U.S. Cl.
CPC .......... *B23Q 15/013* (2013.01); *G05D 19/02* (2013.01)

(58) Field of Classification Search
CPC .. G05B 19/404; G05B 19/18; G05B 19/4093; B23B 29/125; B23Q 15/007; B23Q 15/013; B23Q 15/12; G05D 19/02
See application file for complete search history.

(56) References Cited

U.S. PATENT DOCUMENTS 6,526,566 B1 * 2/2003 Austin .................. H04L 69/162 717/109
8,205,162 B2 * 6/2012 Shah .................. G05B 19/0426 717/109

(Continued)

FOREIGN PATENT DOCUMENTS

CN 105938329 A 9/2016
CN 108732989 A 11/2018

(Continued)

OTHER PUBLICATIONS

Wang et al., New fault tolerant robotic central controller for space robot system based on ARM processor, 2008, IEEE, p. 1-5 (Year: 2008).*

(Continued)

*Primary Examiner* — Mcdieunel Marc
(74) *Attorney, Agent, or Firm* — Studebaker Brackett PLLC

(57) ABSTRACT

Provided is a control device for a machine tool that machines a workpiece by vibration-controlling a control shaft, wherein shaking of the machine tool as a whole is reliably suppressed. This control device for a machine tool includes: a vibration condition setting unit that sets a vibration condition including at least one of a frequency parameter comprising a vibration frequency or a vibration frequency multiple, an amplitude parameter comprising a vibration amplitude or a vibration amplitude multiple, and a vibration direction; a vibration upper limit setting unit that sets, in accordance with one or both of the vibration frequency and the vibration direction, an upper limit value of the vibration parameter that is determined by the vibration condition and includes at least one of the vibration frequency, the vibration amplitude, a vibration speed, a vibration acceleration, and a vibration jerk; a vibration condition limiting unit that limits, on the basis of the upper limit value of the vibration (Continued)

parameter, the vibration condition set by the vibration condition setting unit; and a vibration control unit that vibration-controls a control shaft on the basis of the vibration condition limited by the vibration condition limiting unit.

6 Claims, 4 Drawing Sheets

(56) References Cited

U.S. PATENT DOCUMENTS

| | | | | |
|---|---|---|---|---|
| 8,612,870 | B2 * | 12/2013 | Kodosky | G06F 9/445<br>715/762 |
| 8,924,269 | B1 * | 12/2014 | Seubert | G06Q 40/00<br>705/35 |
| 9,652,435 | B2 * | 5/2017 | Harsha | G06Q 40/00 |
| 9,720,394 | B2 * | 8/2017 | Pohlan | G05B 19/042 |
| 9,760,531 | B2 * | 9/2017 | Harsha | G06F 15/8046 |
| 10,019,410 | B2 * | 7/2018 | Harsha | G06F 15/8046 |
| 2018/0264649 | A1 * | 9/2018 | Ojima | B25J 9/1669 |
| 2022/0184810 | A1 * | 6/2022 | Beck | B25J 9/1692 |
| 2022/0226995 | A1 * | 7/2022 | Beck | B25J 9/1641 |
| 2023/0176557 | A1 * | 6/2023 | Cella | G05B 13/048<br>700/117 |
| 2024/0351209 | A1 * | 10/2024 | Graabæk | G06N 20/00 |

FOREIGN PATENT DOCUMENTS

| | | | |
|---|---|---|---|
| CN | 112305996 | A | 2/2021 |
| JP | 2004-188541 | A | 7/2004 |
| JP | 2007-044849 | A | 2/2007 |
| JP | 2012-119800 | A | 6/2012 |
| JP | 2018-043306 | A | 3/2018 |
| JP | 2021-003802 | A | 1/2021 |
| WO | 2015/146946 | A1 | 10/2015 |
| WO | 2016/084171 | A1 | 6/2016 |

OTHER PUBLICATIONS

Par, et al., Programmable Motion-Fault Detection for a Collaborative Robot 2021, IEEE, p. 1-20 (Year: 2021).*

Phoha et al., Embedded Soft Sensing for Anomaly Detection in Mobile Robotic Networks, 2006, IEEE, p. 1-21 (Year: 2006).*

Quarta et al., An Experimental Security Analysis of an Industrial Robot Controller, 2017, IEEE, p. 268-285 (Year: 2017).*

International Search Report issued in PCT/JP2021/027845; mailed Sep. 7, 2021.

* cited by examiner

MACHINE TOOL CONTROL DEVICE
1
VIBRATION CONDITION SETTING UNIT
11
VIBRATION CONDITION RESTRICTING UNIT
12
VIBRATION UPPER LIMIT SETTING UNIT
13
VIBRATION CONTROL UNIT
14
DISPLAY UNIT
15
3

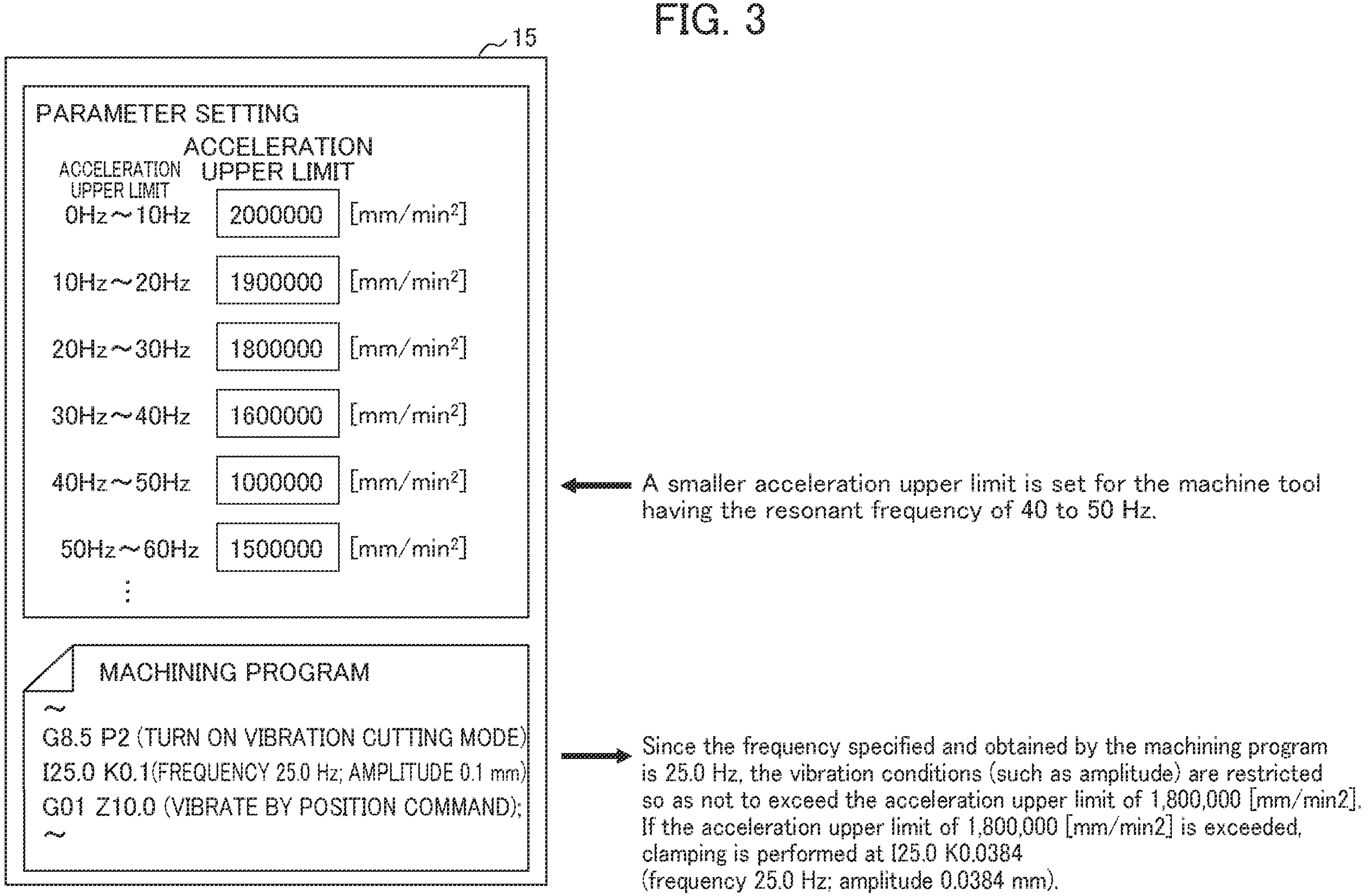

PARAMETER SETTING

| ACCELERATION UPPER LIMIT | ACCELERATION UPPER LIMIT | |
|---|---|---|
| 0Hz～10Hz | 2000000 | [mm/min²] |
| 10Hz～20Hz | 1900000 | [mm/min²] |
| 20Hz～30Hz | 1800000 | [mm/min²] |
| 30Hz～40Hz | 1600000 | [mm/min²] |
| 40Hz～50Hz | 1000000 | [mm/min²] |
| 50Hz～60Hz | 1500000 | [mm/min²] |
| ⋮ | | |

A smaller acceleration upper limit is set for the machine tool having the resonant frequency of 40 to 50 Hz.

MACHINING PROGRAM

```
~
G8.5 P2 (TURN ON VIBRATION CUTTING MODE)
I25.0 K0.1(FREQUENCY 25.0 Hz; AMPLITUDE 0.1 mm)
G01 Z10.0 (VIBRATE BY POSITION COMMAND);
~
```

Since the frequency specified and obtained by the machining program is 25.0 Hz, the vibration conditions (such as amplitude) are restricted so as not to exceed the acceleration upper limit of 1,800,000 [mm/min2]. If the acceleration upper limit of 1,800,000 [mm/min2] is exceeded, clamping is performed at I25.0 K0.0384 (frequency 25.0 Hz; amplitude 0.0384 mm).

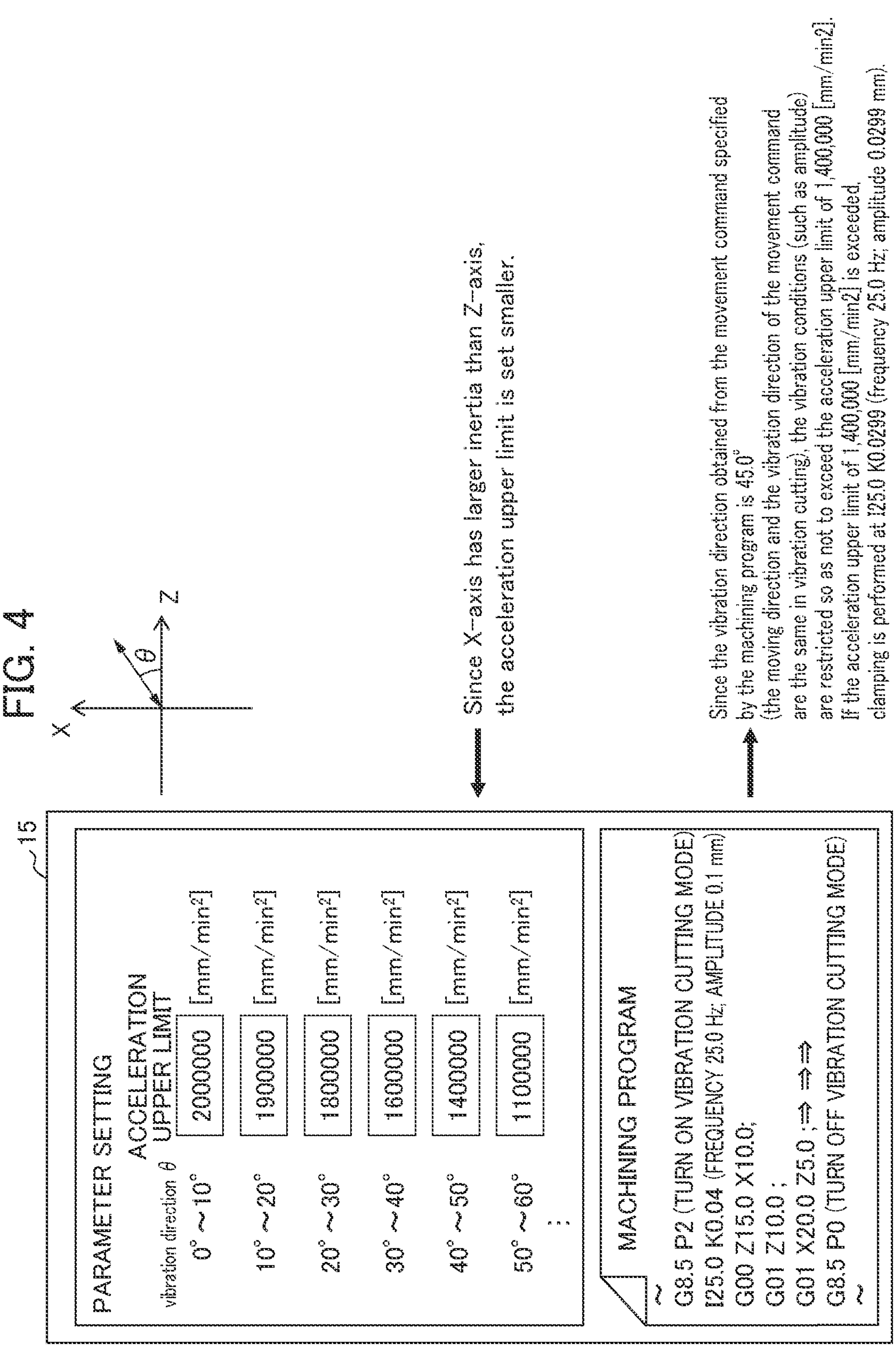

PARAMETER SETTING

| vibration direction θ | ACCELERATION UPPER LIMIT | |
|---|---|---|
| 0° ~10° | 2000000 | [mm/min²] |
| 10° ~20° | 1900000 | [mm/min²] |
| 20° ~30° | 1800000 | [mm/min²] |
| 30° ~40° | 1600000 | [mm/min²] |
| 40° ~50° | 1400000 | [mm/min²] |
| 50° ~60° | 1100000 | [mm/min²] |
| ⋮ | | |

Since X-axis has larger inertia than Z-axis, the acceleration upper limit is set smaller.

MACHINING PROGRAM

```
~
G8.5 P2 (TURN ON VIBRATION CUTTING MODE)
I25.0 K0.04 (FREQUENCY 25.0 Hz; AMPLITUDE 0.1 mm)
G00 Z15.0 X10.0;
G01 Z10.0 ;
G01 X20.0 Z5.0 ;⇒ ⇒⇒
G8.5 P0 (TURN OFF VIBRATION CUTTING MODE)
~
```

Since the vibration direction obtained from the movement command specified by the machining program is 45.0° (the moving direction and the vibration direction of the movement command are the same in vibration cutting), the vibration conditions (such as amplitude) are restricted so as not to exceed the acceleration upper limit of 1,400,000 [mm/min2]. If the acceleration upper limit of 1,400,000 [mm/min2] is exceeded, clamping is performed at I25.0 K0.0299 (frequency 25.0 Hz; amplitude 0.0299 mm).

CONTROL DEVICE FOR MACHINE TOOL

TECHNICAL FIELD

The present disclosure relates to a control device for machine tools.

BACKGROUND ART

Conventionally, control devices for machine tools have been known, in which a workpiece is machined by controlling the control shaft to move while being vibrated, such as in oscillation cutting or crankpin machining. When the control shaft is vibrated in this manner, the vibration may cause excessive shaking in the entire machine tool, which may adversely affect the machining accuracy.

Accordingly, a technique has been proposed to set the upper limit value of the vibration acceleration or jerk, and to control the vibration below the set upper limit value, in order to prevent excessive shaking of the entire machine tool caused by the vibration of the control shaft (see Patent Document 1, for example). It is thought that this technique can ensure good surface finish.

Patent Document 1: Japanese Unexamined Patent Application, Publication No. 2007-044849

DISCLOSURE OF THE INVENTION

Problems to be Solved by the Invention

However, even if the vibration acceleration is reduced by setting an upper limit value of the vibration acceleration, the shaking of the entire machine tool may increase conversely, due to the influence of the resonance frequency specific to the machine tool, and the differences in the inertia of each control shaft. In other words, simply setting an upper limit value of the vibration acceleration or jerk, without considering the vibration frequency and the inertia of the control shaft, cannot reliably suppress the shaking of the entire machine tool.

Therefore, a technique has been desired which can reliably suppress the shaking of the entire machine tool, in a machine tool control device that controls the vibration of the control shaft while machining a workpiece.

Means for Solving the Problems

One aspect of the present disclosure is a control device for a machine tool that machines a workpiece while vibrating a tool and the workpiece relative to each other, in which the machine tool control device includes: a vibration condition setting unit that sets a vibration condition including at least one of a frequency parameter consisting of a vibration frequency or a vibration frequency multiplying factor, an amplitude parameter consisting of a vibration amplitude or a vibration amplitude multiplying factor, or a vibration direction; a vibration upper limit setting unit that sets an upper limit value of a vibration parameter, which includes at least one of a vibration frequency, a vibration amplitude, a vibration velocity, a vibration acceleration, or a vibration jerk determined by the vibration condition, based on one or both of the vibration frequency and the vibration direction; a vibration condition restricting unit that restricts the vibration condition set by the vibration condition setting unit, based on the upper limit value of the vibration parameter; and a vibration control unit that executes vibration control of a control shaft, based on the vibration condition restricted by the vibration condition restricting unit.

Effects of the Invention

According to the present disclosure, the shaking of the entire machine tool can be reliably suppressed, in a machine tool control device that controls vibration of the control shaft while machining a workpiece.

BRIEF DESCRIPTION OF THE DRAWINGS

FIG. 3 is a diagram illustrating a first example of the vibration control according to the embodiment; and FIG. 4 is a diagram illustrating a second example of the vibration control according to the embodiment.

PREFERRED MODE FOR CARRYING OUT THE INVENTION

Hereinafter, an embodiment of the present disclosure will be described in detail with reference to the drawings.

Figure 1:
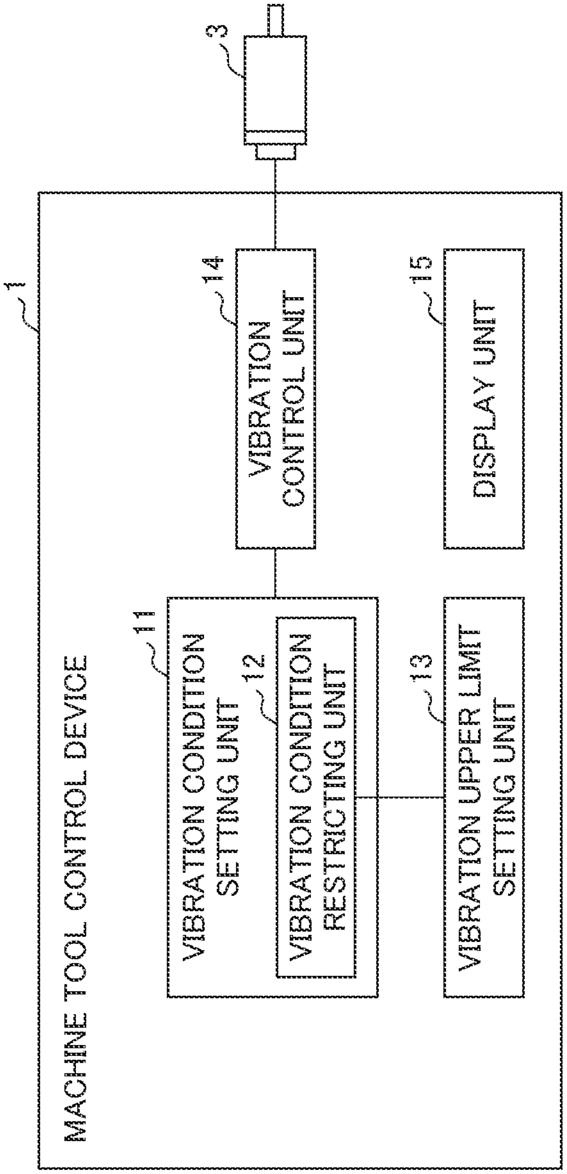
FIG. 1 is a diagram illustrating a machine tool control device according to an embodiment of the present disclosure.

FIG. 1 is a diagram illustrating a machine tool control device 1 according to the present embodiment. The machine tool control device 1 according to the present embodiment operates at least one main shaft for rotating a cutting tool (hereinafter referred to as the tool) and a workpiece relative to each other, and at least one feed shaft for moving the tool relative to the workpiece, whereby the tool cuts and machines the workpiece. For convenience, FIG. 1 only illustrates a motor 3 that drives one feed shaft.

The machine tool control device 1 according to the present embodiment performs oscillation cutting (hereinafter also referred to as vibration cutting) by operating the main shaft and the feed shaft. That is, the machine tool control device 1 performs cutting machining by rotating the tool and the workpiece relative to each other, while oscillating (hereinafter, also referred to as vibrating) the tool and the workpiece relative to each other. The tool route as a tool path is set such that the current route partially overlaps the previous route, and a portion machined in the previous route is included in the current route. Therefore, separating the tool tip from the surface of the workpiece (air cutting) reliably shreds the chips which are continuously produced during the cutting machining.

The present embodiment is applicable to the configuration in which the tool is vibrated while moving in the feed direction with respect to the workpiece that rotates around the central axis line, and is also applicable to the configuration in which the tool T rotates around the central axis line of the workpiece and the workpiece moves in the feed direction with respect to the tool. The present embodiment is applicable to both of machining an outer or inner diameter of a workpiece. Further, the present embodiment is applicable to the case where a plurality of feed shafts (Z-axis and X-axis) are required because the workpiece has a tapered part or an arcuate part on the machining surface, and is also applicable to the case where a particular one axis (Z-axis) is sufficient for the feed shaft because the workpiece is columnar or cylindrical.

The machine tool control device 1 is configured using a computer including a memory such as ROM (read only memory) or RAM (random access memory), a CPU (central processing unit), and a communication control unit, which are connected to each other via a bus. As illustrated in FIG. 1, the machine tool control device 1 includes a vibration condition setting unit 11, a vibration condition restricting unit 12, a vibration upper limit setting unit 13, a vibration control unit 14, and a display unit 15, in which the functions and operations of these units can be achieved by cooperation of the CPU, memory, and the control program stored in the memory mounted on the computer.

The machine tool control device 1 is connected to higher-level computers (not illustrated), such as a CNC (computer numerical controller) or a PLC (programmable logic controller). These higher-level computers input machining programs, rotation speeds, feed speeds, and other workpiece machining conditions to the machine tool control device 1.

The workpiece machining conditions include relative rotation speeds of the workpiece and the tool around the central axis line of the workpiece, relative feed speeds of the tool and the workpiece, and position commands for the feed shaft, etc. In the present embodiment, the CPU inside the machine tool control device 1 may be configured to read the rotation speed and the feed speed from the inputted machining program as the machining conditions and output them to the vibration control unit 14; alternatively, a position command generating unit etc. inside the vibration control unit 14 may be provided on the higher-level computers.

The vibration condition setting unit 11 sets vibration conditions that include at least one of: frequency parameters composed of vibration frequency or vibration frequency multiplying factor; amplitude parameters composed of vibration amplitude or vibration amplitude multiplying factor; or vibration direction. The vibration condition setting unit 11 sets the vibration conditions under the restrictions of the vibration condition restricting unit 12, based on the machining programs and the machining conditions, etc. that are inputted into the machine tool control device 1. The vibration conditions that are set by the vibration condition setting unit 11 are outputted to the vibration control unit 14 described later.

Here, the vibration frequency multiplying factor is a frequency parameter obtained by dividing the vibration frequency by the speed of the main shaft. The vibration amplitude multiplying factor is an amplitude parameter obtained by dividing the vibration amplitude by half the feed amount of the feed shaft per rotation of the main shaft. The vibration direction is represented by a tilt angle θ relative to the central axis line (Z-axis direction) of the workpiece (refer to FIG. 4 described later).

The vibration upper limit setting unit 13 sets the upper limit values of the vibration parameters, which include at least one of the vibration frequency, vibration amplitude, vibration speed, vibration acceleration, or vibration jerk as determined by the vibration conditions, based on one or both of the vibration frequency and the vibration direction. The upper limit values of the vibration parameters that are set by the vibration upper limit setting unit 13 are outputted to the vibration condition restricting unit 12 described later.

The vibration upper limit setting unit 13, when setting the upper limit value of the vibration parameters based on the vibration frequency, preferably sets the upper limit value of the vibration parameters to decrease stepwise or continuously as the vibration frequency increases. This is because the machine tool is more likely to shake as the vibration frequency increases. For example, the vibration upper limit setting unit 13 sets the upper limit values of the vibration parameters, such as the acceleration limit values, to decrease as the vibration frequency increases in 10 Hz intervals such as 0-10 Hz, 10-20 Hz, 20-30 Hz, etc. (refer to FIG. 3 described later).

The shaking of the entire machine tool due to the vibration control of the control shaft is attributable to the vibration frequency, vibration amplitude, vibration speed, vibration acceleration, and vibration jerk. The vibration amplitude, vibration speed, vibration acceleration, and vibration jerk are influenced by the vibration frequency. In contrast, in the present embodiment, by setting the upper limit values of vibration parameters such as vibration frequency, vibration amplitude, vibration speed, vibration acceleration, and vibration jerk, based on the vibration frequency, and setting the vibration conditions based on these set upper limit values, the shaking of the entire machine tool is effectively suppressed.

When the vibration frequency corresponds to the resonance frequency specific to the machine tool, the vibration upper limit setting unit 13 more preferably sets the upper limit value of the vibration parameter to a smaller value than the cases of other frequencies. For example, when the resonance frequency specific to the machine tool is 40 to 50 Hz, the vibration upper limit setting unit 13 sets the upper limit value of the vibration parameters to a smaller value than the cases of other vibration frequencies below 40 Hz or greater than 50 Hz.

When the vibration frequency in the vibration control of the control shaft corresponds to the resonance frequency specific to the machine tool, the machine tool vibrates more in synchronization with the vibration of the control shaft. In contrast, in the present embodiment, by setting the upper limit value of the vibration parameters to a smaller value when the vibration frequency corresponds to the resonance frequency, and setting the vibration conditions based on these set upper limit values, the shaking of the entire machine tool is more effectively suppressed.

When the vibration frequency corresponds to the resonance frequency, the resonance frequency specific to the machine tool may be included in the vibration frequency band with a certain width, such as 10 Hz. In this case, the width of the vibration frequency band is set as appropriate.

The vibration upper limit setting unit 13 may preferably set the upper limit value of the vibration parameters to decrease stepwise or continuously as the tilt of the vibration direction increases relative to the central axis direction of the workpiece. In this case, for example, when the tilt θ of the oscillation direction (hereinafter also referred to as the vibration direction) relative to the central axis line (Z-axis direction) of the workpiece increases in 10° intervals such as 0° to 10°, 10° to 20°, and 20° to 30°, the upper limit value of the vibration parameters, such as the acceleration upper limit value, decreases as the tilt θ of the vibration direction relative to the Z-axis direction increases (see FIG. 4 described later).

For example, heavy objects such as servo motors are often located in the X-axis direction (the radial direction of the workpiece) orthogonal to the Z-axis direction (the central axis line direction of the workpiece); therefore, the vibration and inertia of the control shaft are greater in the X-axis than the Z-axis. The inertia of the control shaft varies depending on the machine tool; therefore, the shaking of the entire machine tool caused by vibrating the control shaft is affected by the vibration direction that represents the ratio of the vibration amount of the control shaft. In the present embodiment, the upper limit values of the vibration parameters such as vibration acceleration and vibration jerk are set based on the tilt θ of the vibration direction relative to the Z-axis;

therefore, by setting the vibration conditions based on these set upper limit values of the vibration parameters, the shaking of the entire machine tool is more effectively suppressed.

Naturally, the relative sizes of the inertia of the Z-axis and the X-axis vary depending on the machine configuration; therefore, there may be cases where the inertia is greater in the Z-axis than the X-axis. In such cases, when the tilt θ of the vibration direction increases in 10° intervals such as 0° to 10°, 10° to 20°, and 20° to 30°, as the tilt θ of the vibration direction relative to the Z-axis direction increases, by setting the upper limit value of the vibration parameters such as the acceleration upper limit value to increase, the shaking of the entire machine tool is more effectively suppressed.

The vibration upper limit setting unit 13 preferably sets different upper limit values of the vibration parameters when the vibration direction is parallel or non-parallel to the drive direction of each control shaft. The case where the vibration direction is parallel to the drive direction of each control shaft refers to the case where a single control shaft is vibrated, and the non-parallel case refers to the case where a plurality of drive shafts are vibrated in coordination. That is, when a plurality of drive shafts are vibrated in coordination, an upper limit value of the vibration parameters is preferably set separately from the upper limit value of the vibration parameters for each control shaft. This may more effectively suppress the shaking of the entire machine tool.

When the vibration upper limit setting unit 13 sets the upper limit value of the vibration parameters based on the vibration direction, the vibration frequency may be set as the upper limit value of the vibration parameters. In this case, as the vibration frequency increases, the shaking of the machine tool also increases; therefore, the upper limit value of the vibration frequency is preferably set to decrease as the tilt of the vibration direction relative to the central axis direction of the workpiece increases.

The vibration upper limit setting unit 13 can determine the upper limit value of the vibration parameters, based on the measured shaking of the machine tool when the vibration control of the control shaft is actually performed in advance, which can be visually checked by the user or measured by various sensors.

The vibration condition restricting unit 12 restricts the vibration conditions that are set by the vibration condition setting unit 11, based on the upper limit value of the vibration parameter which is set by the vibration upper limit setting unit 13. Specifically, the vibration condition restricting unit 12 acquires the frequency parameter and the vibration direction from the vibration condition setting unit 11, and restricts the vibration conditions using the upper limit value of the vibration parameter corresponding to the acquired frequency parameter and vibration direction.

The vibration condition restricting unit 12 preferably restricts the vibration conditions that are set by the vibration condition setting unit 11 so as not to exceed the upper limit value of the vibration parameter corresponding to the acquired frequency parameter and vibration direction. For example, the vibration condition restricting unit 12 clamps the vibration frequency and vibration amplitude within the range that does not exceed the upper limit value of the vibration parameter. Alternatively, the vibration condition restricting unit 12 may stop the machining program by issuing an alarm (warning) when the upper limit value of the vibration parameter is exceeded.

The vibration control unit 14 executes vibration control of the control shaft, based on the vibration conditions that are set by the vibration condition setting unit 11 under the restrictions of the vibration condition restricting unit 12. The vibration control unit 14 includes various functional units (all of which are not illustrated), such as a position command generating unit, a vibration command generating unit, a superimposed command generating unit, a learning control unit, and a position speed control unit, in order to execute the vibration control of the control shaft.

The position command generating unit generates position commands as movement commands for the motor 3, based on the machining program and the machining conditions inputted into the machine tool control device 1. Specifically, the position command generating unit generates position commands (movement commands) for each feed shaft, based on the relative rotation speed of the workpiece and tool around the central axis line of the workpiece and the relative feed speed of the tool and workpiece.

The vibration command generating unit generates vibration commands. The vibration command generating unit generates vibration commands, based on the vibration conditions set by the vibration condition setting unit 11 described above.

The superimposed command generating unit calculates a position deviation, which is a difference between the position feedback based on the position detection by the encoder of the motor 3 of the feed shaft and the position command, and generates a superimposed command by superimposing the vibration command generated by the vibration command generating unit on the calculated position deviation. Alternatively, the vibration command may be superimposed on the position command instead of the position deviation.

The learning control unit calculates the compensation amount of the superimposed command, based on the superimposed command, and compensates the superimposed command by adding the calculated compensation amount to the superimposed command. The learning control unit includes memory, stores the relationship between the vibration phase and the compensation amount in the memory in one or a plurality of vibration cycles, reads the superimposed command stored in the memory at a timing that can compensate for the phase lag of the vibration operation, pursuant to the responsiveness of the motor 3, and outputs the superimposed command as a compensation amount. When the vibration phase outputting the compensation amount is not stored in the memory, a compensation amount to be outputted may be calculated from the compensation amount having an approximate vibration phase. In general, as the vibration frequency increases, the position deviation from the vibration command increases; therefore, by compensating with the learning control unit, the followability to the periodic vibration command can be improved.

The position speed control unit generates a torque command for the motor 3 that drives the feed shaft, based on the superimposed command to which the compensation amount is added, and controls the motor 3 with the generated torque command. As a result, machining is performed while vibrating the tool T and the workpiece W relative to each other.

The display unit 15 displays, on a display screen, the upper limit value of the vibration parameter which is set by the vibration upper limit setting unit 13, as well as the vibration conditions which are set by the vibration condition setting unit 11 and restricted by the vibration condition restricting unit 12, based on the upper limit value. The display unit 15 displays, among other setting parameters, the machining program inputted into the machine tool control device 1. This allows the user to set the upper limit value of vibration parameters and vibration conditions through an input unit (not illustrated) while checking the display screen.

Next, the vibration control of the control shaft executed by the machine tool control device 1 according to the present embodiment will be described.

Figure 2:
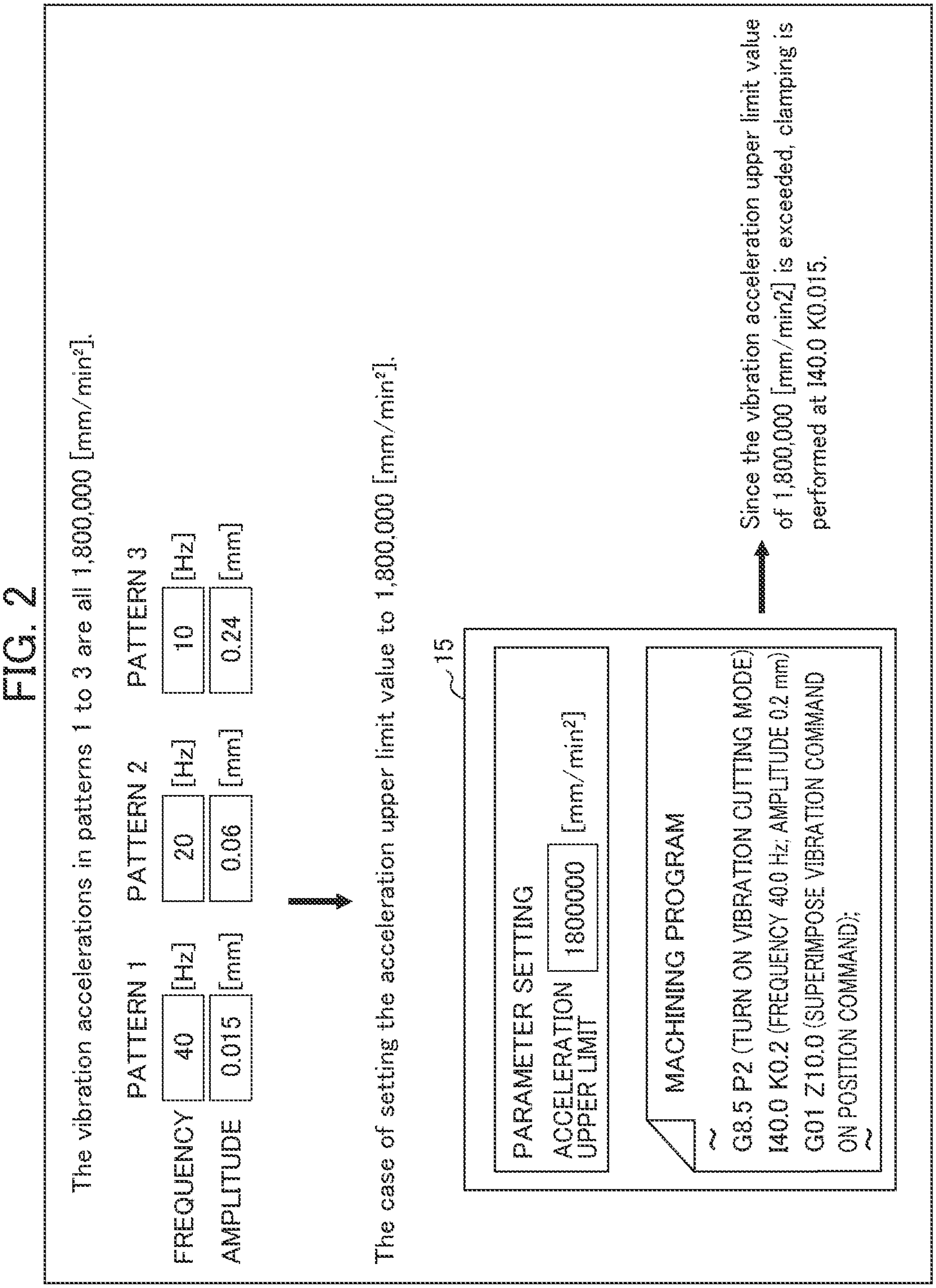
FIG. 2 is a diagram illustrating vibration control according to the embodiment.

FIG. 2 is a diagram illustrating the vibration control according to the present embodiment. As illustrated in FIG. 2, there are several combinations of vibration frequency and vibration amplitude which satisfy a vibration acceleration of 1,800,000 [mm/min$^2$]. FIG. 2 illustrates three patterns of Patterns 1 to 3, in which the vibration acceleration determined based on the vibration conditions in Patterns 1 to 3 is 1,800,000 [mm/min$^2$]. This vibration acceleration is calculated by the following Formula (1).

[Formula 1]

$$\text{Vibration acceleration} = \alpha \times (\text{vibration amplitude}) \times (\text{vibration frequency})^2 \quad \text{Formula (1)}$$

A case is considered in which, as displayed on the display unit 15 in FIG. 2, the acceleration upper limit value is set to 1,800,000 [mm/min$^2$] by the vibration upper limit setting unit 13, and the vibration frequency of 40 Hz and the vibration amplitude of 0.2 mm are specified by the machining program. In this case, as is obvious in comparison with Pattern 1 in which the vibration frequency is 40 Hz and the vibration amplitude is 0.015 mm, the vibration acceleration calculated by Formula (1) exceeds the upper limit value of 1,800,000 [mm/min$^2$]. Therefore, a large shake occurs in the entire machine tool.

In the present embodiment, the vibration condition restricting unit 12 clamps the vibration amplitude at 0.015 mm such that the vibration acceleration does not exceed the upper limit value of 1,800,000 [mm/min$^2$], while maintaining the vibration frequency at 40 Hz, for example. The vibration condition setting unit 11 sets the vibration frequency of 40 Hz and the clamped vibration amplitude of 0.015 mm as the vibration conditions. This ensures that the vibration acceleration equals the upper limit value of 1,800,000 [mm/min$^2$], and the shaking occurring in the entire machine tool is reliably suppressed.

Note that what is clamped is not limited to the vibration amplitude, and the vibration frequency may also be clamped, or both the vibration amplitude and the vibration frequency may be clamped. The method of restricting the vibration conditions is not limited to clamping; for example, a method may be configured to stop the machining program by issuing an alarm or the like when the vibration parameter such as vibration acceleration exceeds its upper limit value.

FIG. 3 is a diagram illustrating the first example of the vibration control according to the present embodiment. The first example illustrated in FIG. 3 is the case where the upper limit value of vibration acceleration is set based on the vibration frequency. Specifically, as displayed on the display unit 15 in FIG. 3, the upper limit value of vibration acceleration is set to 2,000,000 [mm/min$^2$] for a vibration frequency of 0 Hz to 10 Hz (which is equal to or greater than 0 Hz and less than 10 Hz; the same applies hereafter), 1,900,000 [mm/min$^2$] for 10 to 20 Hz, 1,800,000 [mm/min$^2$] for 20 to 30 Hz, 1,600,000 [mm/min$^2$] for 30 to 40 Hz, 1,000,000 [mm/min$^2$] for 40 to 50 Hz, and 1,500,000 [mm/min$^2$] for 50 to 60 Hz; thus, the upper limit value of vibration acceleration is set for each vibration frequency band at intervals of 10 Hz. In the first example, the smaller acceleration upper limit value is set as the vibration frequency increases; and above all, the smallest acceleration upper limit value is set for the vibration frequency of 40 to 50 Hz, which corresponds to the resonant frequency of the machine tool.

In the first example, as displayed on the display unit 15 in FIG. 3, the machining program inputted into the machine tool control device 1 specifies the vibration frequency at 25 Hz and the vibration amplitude at 0.1 mm for the vibration cutting. When the vibration frequency is 25 Hz and the vibration amplitude is 0.1 mm, the vibration acceleration calculated by Formula (1) exceeds the vibration acceleration upper limit value of 1,800,000 [mm/min$^2$] at the vibration frequency of 25 Hz. Therefore, in the first example, while maintaining the vibration frequency at 25 Hz, the vibration amplitude is changed to a smaller value until the calculated vibration acceleration does not exceed the vibration acceleration upper limit value; then, the vibration amplitude is clamped at 0.00384 mm at that time. In this manner, by setting the vibration conditions so as not to exceed the vibration acceleration upper limit value, the shaking occurring in the entire machine tool is reliably suppressed.

FIG. 4 is a diagram illustrating the second example of the vibration control according to the present embodiment. The second example illustrated in FIG. 4 is the case where the upper limit value of vibration acceleration is set based on the vibration direction. Specifically, as displayed on the display unit 15 in FIG. 4, the upper limit value of vibration acceleration is set to 2,000,000 [mm/min$^2$] when the tilt θ of the vibration direction to the Z-axis is 0° to 10° (which is equal to or greater than 0° and less than 10°; the same applies hereafter), 1,900,000 [mm/min$^2$] for 10 to 20°, 1,800,000 [mm/min$^2$] for 20 to 30°, 1,600,000 [mm/min$^2$] for 30 to 40°, 1,400,000 [mm/min$^2$] for 40 to 50°, and 1,100,000 [mm/min$^2$] for 50 to 60°; thus, the upper limit value of vibration acceleration is set for each tilt angle band at intervals of 10°. In the second example, the smaller acceleration upper limit value is set as the tilt of the vibration direction to the Z-axis increases.

In the second example, as displayed on the display unit 15 in FIG. 4, the machining program inputted into the machine tool control device 1 specifies the vibration frequency at 25 Hz and the vibration amplitude at 0.04 mm for the vibration cutting. The movement direction of the movement command specified by the machining program is determined to be 45° from the X coordinate position and Z coordinate position specified by G00, G01. Here, in the vibration cutting in this example, since the vibration direction is the same as the movement direction of the movement command, the tilt θ of the vibration direction to the Z-axis is 45°. When the vibration frequency is 25 Hz and the vibration amplitude is 0.04 mm, the vibration acceleration calculated by Formula (1) exceeds the vibration acceleration upper limit value of 1,400,000 [mm/min$^2$] when the tilt θ of the vibration direction to the Z-axis is 45°. Therefore, in the second example, while maintaining the vibration frequency at 25 Hz, the vibration amplitude is changed to a smaller value until the calculated vibration acceleration does not exceed the vibration acceleration upper limit value; then, the vibration amplitude is clamped at 0.0299 mm at that time. In this manner, by setting the vibration conditions so as not to exceed the vibration acceleration upper limit value, the shaking occurring in the entire machine tool is reliably suppressed.

According to the present embodiment, the following effects are achieved.

The machine tool control device 1 according to the present embodiment includes the vibration condition setting unit 11 that sets a vibration condition including at least one of frequency parameters composed of vibration frequency or vibration frequency multiplying factor, amplitude parameters composed of vibration amplitude or vibration amplitude multiplying factor, or vibration direction. The machine tool control device 1 also includes the vibration upper limit setting unit 13 that sets the upper limit value of the vibration parameters including at least one of vibration frequency, vibration amplitude, vibration speed, vibration acceleration, or vibration jerk, determined by the vibration condition, based on one or both of the vibration frequency and the vibration direction. The machine tool control device 1 according to the present embodiment includes: the vibration condition restricting unit 12 that restricts the vibration condition set by the vibration condition setting unit 11, based on the upper limit value of the vibration parameters; and the vibration control unit 14 that controls the control shaft, based on the vibration condition restricted by the vibration condition restricting unit 12.

The shaking of the entire machine tool associated with vibration control of the control shaft is primarily attributable to the vibration parameters such as vibration acceleration and vibration jerk, and these vibration parameters are affected by the vibration frequency and the vibration direction. In contrast, in the present embodiment, the vibration condition set by the vibration condition setting unit 11 is restricted by the vibration condition restricting unit 12, based on the upper limit value of the vibration parameters set by the vibration upper limit setting unit 13, based on one or both of the vibration frequency and the vibration direction. Therefore, the vibration control of the control shaft can set the vibration condition not to exceed the upper limit value of the vibration parameters set based on the vibration frequency and the vibration direction, and can reliably suppress the shaking occurring in the entire machine tool.

The vibration upper limit setting unit 13 of the present embodiment sets the upper limit value of the vibration parameters to decrease stepwise or continuously as the vibration frequency increases. The machine tool tends to shake more as the vibration frequency increases; however, according to the present embodiment, a more appropriate upper limit value of the vibration parameters can be set based on the vibration frequency; therefore, the shaking occurring in the entire machine tool can be more reliably suppressed.

The vibration upper limit setting unit 13 of the present embodiment sets different values for the upper limit value of the vibration parameters when the vibration direction is parallel or non-parallel to the drive direction of each control shaft. This may more effectively suppress the shaking of the entire machine tool.

The vibration upper limit setting unit 13 of the present embodiment sets the upper limit value of the vibration parameters to decrease or increase stepwise or continuously as the tilt θ of the vibration direction relative to the central axis direction (Z-axis) of the workpiece increases. Depending on the machine configuration, the machine tool may be more likely or unlikely to shake as the inclination θ of the vibration direction relative to the central axis direction (Z-axis) of the workpiece increases; however, according to the present embodiment, a more appropriate upper limit value of the vibration parameters can be set based on the vibration direction; therefore, the shaking occurring in the entire machine tool can be more reliably suppressed.

When the vibration frequency corresponds to the resonance frequency specific to the machine tool, the vibration upper limit setting unit 13 of the present embodiment sets the upper limit value of the vibration parameters to a smaller value than the cases of other frequencies. When the vibration frequency corresponds to the resonance frequency of the machine tool, the machine tool is more likely to shake; however, according to the present embodiment, a more appropriate upper limit value of the vibration parameters can be set based on the resonance frequency; therefore, the shaking occurring in the entire machine tool can be more reliably suppressed.

In the present embodiment, the vibration condition restricting unit 12 restricts the vibration condition set by the vibration condition setting unit 11 so as not to exceed the upper limit value of the vibration parameters. As a result, according to the present embodiment, the upper limit value of the vibration parameters can be reliably avoided from being exceeded; therefore, the shaking occurring in the entire machine tool can be more reliably suppressed.

Note that the present disclosure is not limited to the above embodiments, and modifications and improvements that can achieve the objective of the present disclosure are included in the present disclosure.

For example, in the above embodiment, the present invention is applied to vibration cutting; however, the present invention is not limited to this. The present invention is also applicable to a machine tool control device that controls a control shaft in machining a workpiece while vibrating and moving the control shaft, such as in crankpin machining, in which effects similar to the effects of the above embodiment can be achieved.

The above embodiment has been described with the example of setting the upper limit value of the vibration parameter based on the vibration frequency and the example of setting the same based on the vibration direction; however, the present invention is not limited to this. The upper limit value of the vibration parameter can also be set based on both the vibration frequency and the vibration direction.

In the above embodiment, the machine tool control device 1 is configured with a display unit 15; however, the present invention is not limited to this. The machine tool control device 1 may not include the display unit 15, but instead be provided on a higher-level computer or the like.

EXPLANATION OF REFERENCE NUMERALS

1: machine tool control device
3: motor
11: vibration condition setting unit
12: vibration condition restricting unit
13: vibration upper limit setting unit
14: vibration control unit
15: display unit

The invention claimed is:

1. A control device for a machine tool that machines a workpiece while vibrating a tool and the workpiece relative to each other, the device comprising:

a vibration condition setting unit that sets a vibration condition including at least one of a frequency parameter consisting of a vibration frequency or a vibration frequency multiplying factor, an amplitude parameter consisting of a vibration amplitude or a vibration amplitude multiplying factor, or a vibration direction;

a vibration upper limit setting unit that sets an upper limit value of a vibration parameter, which includes at least one of a vibration frequency, a vibration amplitude, a vibration velocity, a vibration acceleration, or a vibration jerk, which are determined by the vibration condition, based on one or both of the vibration frequency and the vibration direction, such that shaking caused in an entirety of the machine tool is suppressed;

a vibration condition restricting unit that restricts the vibration condition set by the vibration condition setting unit, based on the upper limit value of the vibration parameter; and a vibration control unit that executes vibration control of a control shaft, based on the vibration condition restricted by the vibration condition restricting unit.

2. The control device for a machine tool according to claim 1, wherein the vibration upper limit setting unit sets the upper limit value of the vibration parameter to decrease stepwise or continuously as the vibration frequency increases.

3. The control device for a machine tool according to claim 1, wherein the vibration upper limit setting unit sets the upper limit value of the vibration parameter to different values when the vibration direction is parallel or non-parallel to the drive direction of each control shaft.

4. The control device for a machine tool according to claim 1, wherein the vibration upper limit setting unit sets the upper limit value of the vibration parameter to decrease or increase stepwise or continuously as the tilt of the vibration direction relative to the central axis direction of the workpiece increases.

5. The control device for a machine tool according to claim 1, wherein, when the vibration frequency corresponds to a resonance frequency specific to the machine tool, the vibration upper limit setting unit sets the upper limit value of the vibration parameter to a smaller value than in cases of other frequencies.

6. The control device for a machine tool according to claim 1, wherein the vibration condition restricting unit restricts the vibration condition set by the vibration condition setting unit so as not to exceed the upper limit value of the vibration parameter.

* * * * *